United States Patent
Gouda et al.

(10) Patent No.: US 7,328,763 B2
(45) Date of Patent: Feb. 12, 2008

(54) HYBRID DRIVE SYSTEM OF VEHICLE

(75) Inventors: Hideaki Gouda, Ageo (JP); Mitsuhiro Nishina, Ageo (JP); Yuji Suzuki, Ageo (JP)

(73) Assignee: Nissan Diesel Motor Co., Ltd., Saitama (JP)

( * ) Notice: Subject to any disclaimer, the term of this patent is extended or adjusted under 35 U.S.C. 154(b) by 170 days.

(21) Appl. No.: 10/566,837

(22) PCT Filed: Aug. 12, 2003

(86) PCT No.: PCT/JP03/10250

§ 371 (c)(1),
(2), (4) Date: Feb. 2, 2006

(87) PCT Pub. No.: WO2005/014323

PCT Pub. Date: Feb. 17, 2005

(65) Prior Publication Data

US 2006/0213706 A1    Sep. 28, 2006

(51) Int. Cl.
*B60K 6/00* (2006.01)
(52) U.S. Cl. .................. 180/65.2; 180/65.1; 180/65.4; 180/205; 180/6.48; 180/60; 180/214; 180/216; 180/220; 180/242; 180/298
(58) Field of Classification Search .............. 180/65.2, 180/65.1, 65.4, 205, 6.48, 60, 214, 216, 220, 180/242, 298
See application file for complete search history.

(56) References Cited

U.S. PATENT DOCUMENTS 5,806,617 A * 9/1998 Yamaguchi ................ 180/65.2
5,931,249 A * 8/1999 Ellis et al. ................... 180/165
5,934,396 A * 8/1999 Kurita ........................ 180/65.2
6,019,183 A   2/2000 Shimasaki et al.

FOREIGN PATENT DOCUMENTS

| EP | 1332907 | 8/2003 |
|---|---|---|
| FR | 2 782 035 | 2/2000 |
| JP | 6-14445 | 2/1994 |
| JP | 10-257610 | 9/1998 |
| JP | 2000-343965 | 12/2000 |
| JP | 2001-173479 | 6/2001 |

* cited by examiner

*Primary Examiner*—Christopher P. Ellis
*Assistant Examiner*—Cynthia F. Collado
(74) *Attorney, Agent, or Firm*—Rabin & Berdo, PC

(57) ABSTRACT

A hybrid electric drive system for a vehicle comprises a combustion engine (1), a transmission (2), a first clutch (3) disposed between the engine (1) and the transmission (2), a rotating electric machine (4) which serves as a motor as well as a generator, a second clutch (30) disposed between the rotating electric machine (4) and the transmission (2), and a storage device (9). When the second clutch (30) is commanded to connect the rotating electric machine (4) to the transmission (2), a control unit (10) controls the rotating electric machine (4) so as to decrease the difference between the rotation speeds of the rotating electric machine (4) and the transmission (2) (S2) and cause the second clutch (30) to connect the rotating electric machine (4) to the transmission (2) only after the difference decreases to a allowable value (S3, S4).

5 Claims, 5 Drawing Sheets

HYBRID DRIVE SYSTEM OF VEHICLE

TECHNICAL FIELD

The present invention relates to a hybrid drive system which is provided with an engine and a rotating electric machine (motor generator) as power sources of a vehicle.

BACKGROUND OF THE ART

As a hybrid drive system, Japanese Patent Laid-Open Publication No. 2000-343965 discloses a hybrid drive system which is provided with a path to transmit an engine output via a transmission to wheels and a path to input a rotating electric machine output to the transmission.

Also, Japanese Patent Laid-Open Publication No. 2001-173479 discloses a hybrid drive system which is provided with a drive motor to drive a vehicle and an engine to drive an electric generator, and compensates for torque variation with the drive motor when the engine is started by the electric generator.

In the system according to the Japanese Patent Laid-Open Publication No. 2000-343965, when the vehicle travels by only the engine output, the operation of the rotating electric machine is maintained in a stopped state, but the rotating electric machine remains to be connected to the drive system, and thus, the inertial mass and friction of the rotating electric machine cause a drive loss, which consequently inhibits the improvement of fuel economy of the engine.

DISCLOSURE OF THE INVENTION

An object of the invention is to reduce a drive loss when a rotating electric machine is not operated.

In order to achieve the object described above, a hybrid drive system for a vehicle according to the present invention comprises a transmission for changing, rotation of an input shaft to transmit the changed rotation from an output shaft to wheels, a first clutch to connect and disconnect power transmission between an output shaft of an engine and the input shaft of the transmission, a rotating electric machine to serve as both a motor and an electric generator, a second clutch to connect and disconnect the power transmission between an input/output shaft of the rotating electric machine and the input shaft of the transmission, a storage device to store electric power supplied from the rotating electric machine, and a control unit of the second clutch to perform control of a rotational speed of the rotating electric machine when the second clutch is connected, wherein the second clutch is connected after a difference in speed between the rotational speed of the rotating electric machine and a rotational speed at the transmission side falls within a permissible range.

Therefore, according to the present invention, when the rotating electric machine is not operated, the rotating electric machine is separated from the drive system by the second clutch, and thus, it is possible that a load of the drive system generated by the inertial mass and friction of the rotating electric machine is reduced and the drive loss is decreased, leading to an improvement of the fuel economy of the engine.

Furthermore, the second clutch is connected after the difference between the input rotational speed and the output rotational speed is eliminated by the control of the rotational speed of the rotating electric machine, and therefore, the connection can be performed smoothly.

BEST MODES FOR CARRYING OUT THE INVENTION

Figure 1:
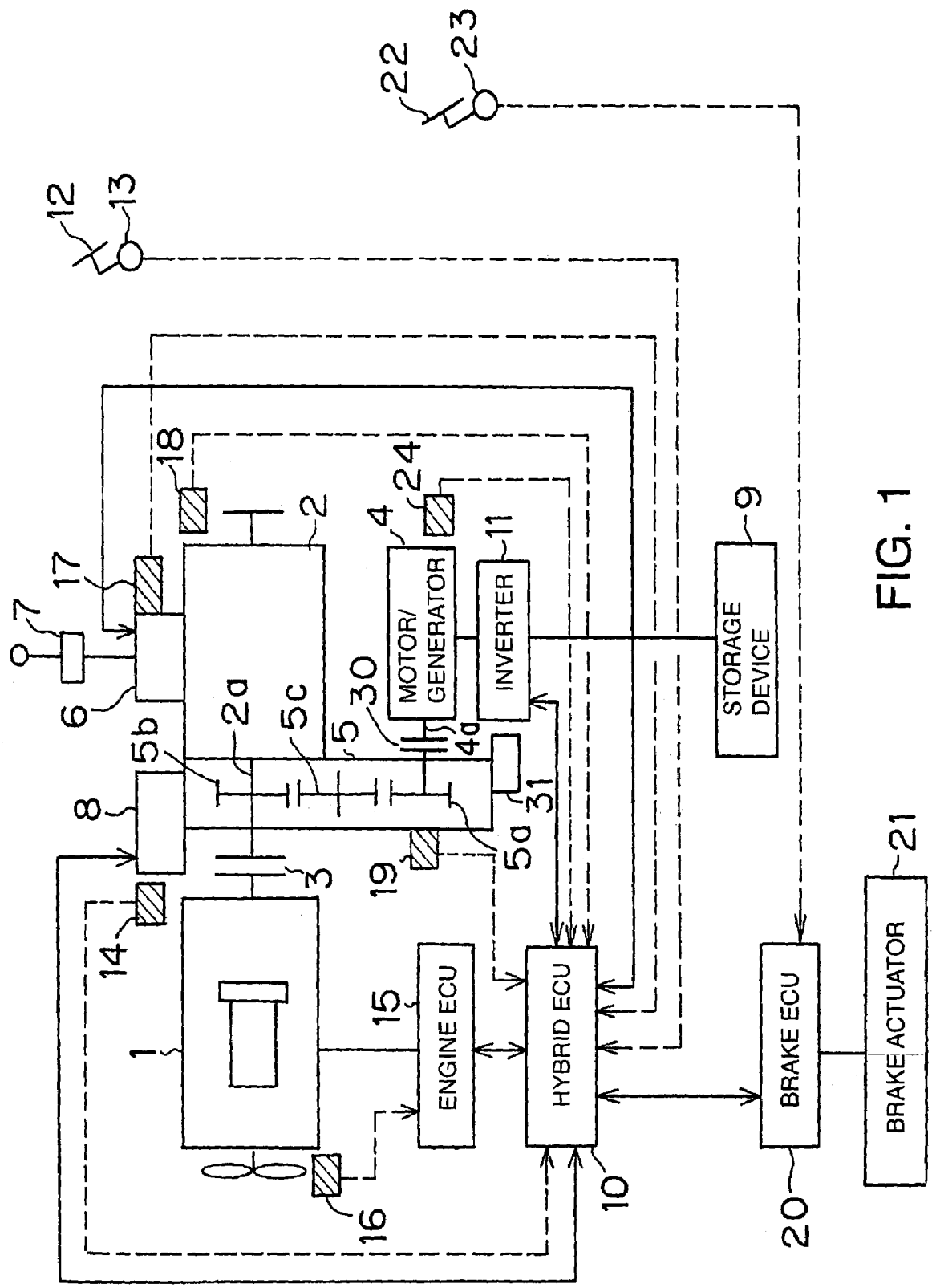
FIG. 1 is a schematic view of a system showing an embodiment according to the present invention.

Referring to FIG. 1, the reference numeral 1 denotes an internal combustion engine and-the reference numeral 2 denotes a gear-type transmission, and a friction clutch 3 (first clutch) is interposed between them.

As the engine 1, a diesel engine or a CNG engine (engine which uses a Compressed Natural Gas as fuel) is used. The reference numeral 4 denotes a rotating electric machine (motor/generator), which serves as an electric generator and an electric motor. An input/output shaft 4a of the rotating electric machine 4 is coupled to a side of an input shaft 2a of the transmission 2 via a rotation transmission mechanism 5 as a gearbox.

The transmission 2 is provided with a control unit 6 to control a gearshift thereof. The control unit 6 is connected to a change lever unit 7 and a hybrid Electronic Control Unit 10 (hybrid ECU). When the change lever unit 7 generates a gearshift command, the control unit 6 controls the transmission 2 according to a signal from the hybrid ECU 10 to achieve the gearshift in accordance with the gearshift command. An output shaft 2b of the transmission 2 is connected to a propeller shaft 32 to transmit a driving force to wheels.

The first clutch 3 is controlled by the hybrid ECU 10 via a clutch actuator 8 to connect or disconnect power transmission from the engine 1 to the transmission 2 and the gearbox 5 (rotation transmission mechanism).

In order to control an amount of fuel supply to the engine 1, an engine electronic control unit 15 (engine ECU) is provided.

The engine ECU 15 controls the amount of fuel supply to the engine 1 according to the request of the hybrid ECU 10. The rotational speed of the engine 1 is controlled by the hybrid ECU 10 by monitoring a signal from an engine revolution sensor 16 detecting the rotational speed of the engine 1, to a target rotational speed.

A brake actuator 21 for applying braking forces to the wheels is controlled by a brake electronic control unit 20 (brake ECU) based on a regenerative braking force of the rotating electric machine 4, which is braking information from the hybrid ECU 10 and a depressing amount of a brake pedal 22 (required braking force) in such a way as to compensate for a shortage of the braking force produced by the regenerative braking force. The reference numeral 23 is a brake sensor for detecting the depressing amount of the brake pedal 22.

As the rotating electric machine 4, an Interior Permanent Magnet synchronous motor (IPM synchronous motor) is used from a viewpoint of high efficiency and reduction in size and weight. The rotating electric machine 4 is connected to a storage device 9 via an inverter 11. A double layer capacitor is applied as the storage device 9 in order to collect the energy generated by regenerative braking efficiently in a short time without waste. The double layer capacitor can achieve a high current density with respect to a battery mass allowance of the vehicle.

The inverter 11 controls the rotating electric machine 4 to an electric drive mode or a power generation mode according to a request of the hybrid. ECU 10. In the electric drive mode, the inverter 11 converts the stored energy (direct current power) of the storage device 9 into the alternating current power and supplies it to the rotating electric machine 4. As a result, the rotating electric machine 4 generates a driving force as the motor. On the other hand, in the power generation mode, the inverter 11 converts the power generated by the rotating electric machine 4 (alternating current power) into the direct current power to charge the storage device 9.

The gearbox 5 is provided with a drive gear 5a coupled to the input/output shaft 4a of the rotating electric machine 4, a driven gear 5b coupled to the input shaft 2a of the transmission 2 and an idler gear 5c engaged therewith.

The rotational speed of the input/output shaft 4a of the rotating electric machine 4 is reduced by the gearbox 5 to be transmitted to the input shaft 2a of the transmission 2. On the other hand, the rotational speed of the input shaft 2a of the transmission 2 is increased by the gearbox 5 to be transmitted to the input/output shaft 4a of the rotating electric machine 4.

An engaging clutch 30 (second clutch) is interposed between the input/output shaft 4a of the rotating electric machine 4 and a rotating shaft of the drive gear 5a. The second clutch 30 is controlled by the hybrid ECU 10 via a clutch actuator 31. While the rotating electric machine 4 is operated, the second clutch 30 is maintained in a connected state, and when the operation of the rotating electric machine 4 is stopped, the second clutch 30 is switched to a disconnected state.

In order to detect the operating information which is required for the control in the hybrid ECU 10, there are provided an accelerator pedal sensor 13 to detect a depressing amount of an accelerator pedal 12 (a required amount input from the accelerator pedal), a clutch position sensor 14 to detect a connection and disconnection of the clutch 3, a gear position sensor 17 to detect a gear position of the transmission 2, a vehicle speed sensor 18 to detect an output rotational speed of the transmission 2 (an output rotation sensor of the transmission 2), a gear rotation sensor 19 to detect a rotational speed of the drive gear 5a which is coupled to the input/output shaft 4a of the rotating electric machine 4 as an input rotational speed of the transmission 2 (an input rotation sensor of the transmission 2) and a rotation sensor 24 to detect a rotational speed (the number of revolutions) of the rotating electric machine 4.

Based on the various information (obtained from the engine ECU 15, the brake ECU 20, the control unit 6 of the transmission 2, and the inverter 11) including detection signals of the various sensors described above and the SOC (State Of Charge) of the storage device 9, the hybrid ECU 10 controls the clutch actuator 8 of the first clutch 3, the inverter 11 of the rotating electric machine 4 and the clutch actuator 31 of the second clutch 30, and on the other hand, outputs an engine operation request to the engine ECU 15, a brake request to the brake ECU 20, and further, a command (for gear change-over) of the transmission 2 to the control unit 6.

Driving modes which are switched over according to control by the hybrid ECU 10 will be described with reference to FIGS. 2 to 7.

Figure 2:
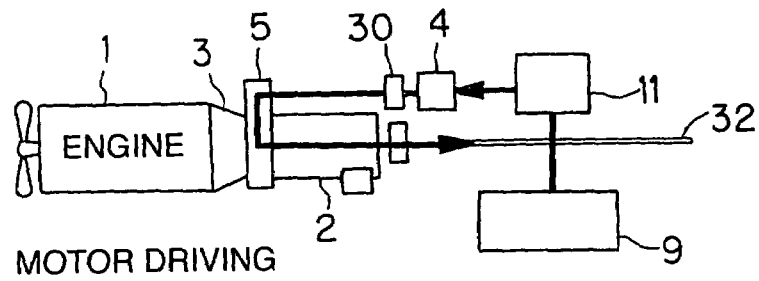
FIG. 2 is an explanatory view illustrating a driving mode.

FIG. 2 shows a case where the vehicle starts and travels by only the output of the rotating electric machine 4.

Herein, the inverter 11 operates in the electric drive mode so that the output according to the required amount input from the accelerator pedal is obtained from the rotating electric machine 4. In this occasion, the second clutch 30 is connected and the first clutch 3 is disconnected.

As shown in the thick line arrow of FIG. 2, the output of the rotating electric machine 4 is transmitted via the second clutch 30 and the gearbox 5 to the input shaft 2a of the transmission 2. It is then transmitted through the gears in the transmission 2 to the output shaft 2b of the transmission 2, and finally it is transmitted to the wheels via the propeller shaft 32.

Figure 3:
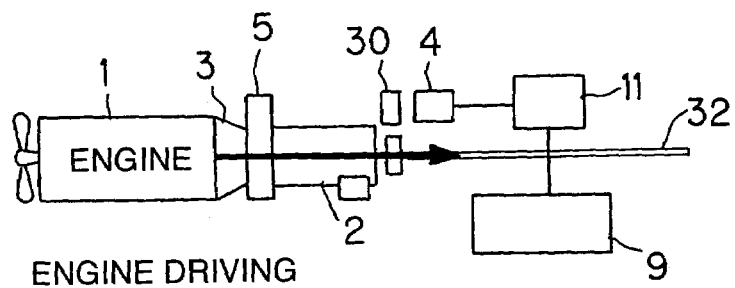
FIG. 3 is an explanatory view illustrating another driving mode.

FIG. 3 shows a case where the vehicle travels by only the output of the engine 1.

When traveling by only the output of the engine 1 is to be performed, the hybrid ECU 10 transmits an engine drive request to the engine ECU 15. The engine ECU 15 controls the amount of fuel supply to the engine 1 so that the output of the engine 1 according to the required amount input from the accelerator pedal can be obtained, and at the same time, upon disconnecting the second clutch 30 and connecting the first clutch 3, the hybrid ECU 10 stops the operation of the rotating electric machine 4.

The output of the engine 1 is, as shown in the thick line arrow, transmitted via the first clutch 3 to the input shaft 2a of the transmission 2. It is then transmitted through the gears in the transmission 2 to the output shaft 2b of the transmission 2, and finally it is transmitted to the wheels via the propeller shaft 32.

Figure 4:
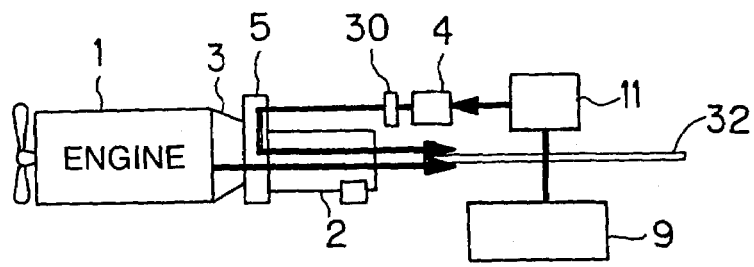
FIG. 4 is an explanatory view illustrating yet another driving mode.

FIG. 4 shows a case where the output of the rotating electric machine 4 and the output of the engine 1 are used together for the travel of the vehicle.

In a traveling state in which the required driving force of the vehicle is larger, for instance in an uphill climbing, the output of the engine 1 and the output of the rotating electric machine 4 are combined.

With the first clutch 3 and the second clutch 30 connected, the hybrid ECU 10 outputs an engine drive request to the engine ECU 15 to cause the engine 1 to generate the drive force allotted to the engine 1, and on the other hand, performs a switching control of the inverter 11 to the electric drive mode so that the driving force allotted to the rotating electric machine 4 is obtained.

The output of the rotating electric machine 4 is transmitted via the second clutch 30 and the gearbox 5 to the input shaft 2a of the transmission 2, as shown in the thick line arrow of the figure. Moreover, the output of the engine 1 is combined in the first clutch 3 to be further transmitted through the transmission gears, from the output shaft 2b of the transmission 2 via the propeller shaft 32 to the wheels.

Figure 5:
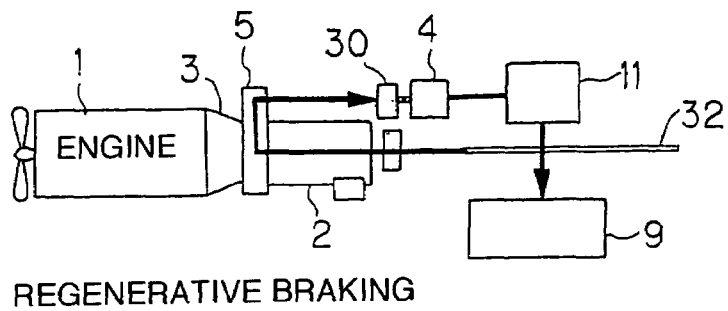
FIG. 5 is an explanatory view illustrating yet another driving mode.

FIG. 5 shows a case where energy regeneration is performed by the rotating electric machine 4.

In a deceleration traveling state involving a vehicle braking, the rotating electric machine 4 is made to serve as the electric generator for energy regeneration as long as the charge to the storage device 9 is possible, thus performing the energy regeneration. The hybrid ECU 10 outputs a command to the inverter 11 so that the inverter 11 is switched to the power generation mode and the regenerative braking force according to the brake operation amount can be obtained from the rotating electric machine 4.

The rotations of the wheels are, as shown in the thick line arrow of the figure, transmitted from the propeller shaft 32 through the output shaft 2b of the transmission 2 and the transmission gears to the input shaft 2a of the transmission 2, and further via the gearbox 5 and the second clutch 30 to the input/output shaft 4a of the rotating electric machine 4. And thus, the regenerative power generation of the rotating electric machine 4 is performed, and the generated power is transmitted via the inverter 11 to the storage device 9 for charge.

The inertia energy of the vehicle during braking is converted to electric energy by power generation of the rotating electric machine 4 to be collected to the storage device 9. In a case where only the power generation of the rotating electric machine 4 is not satisfied with the required amount of the braking, based upon the request to the brake ECU 20, the shortage is compensated by a braking force by the brake actuator of the vehicle.

Figure 6:
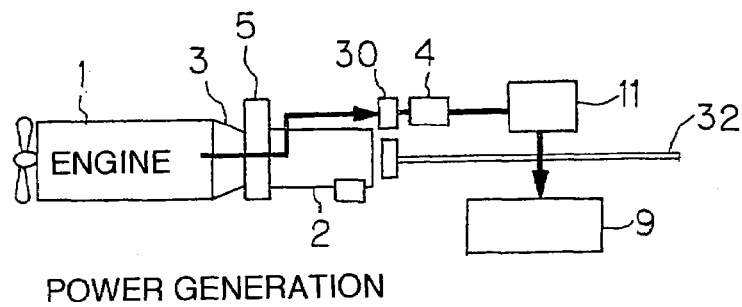
FIG. 6 is an explanatory view illustrating yet another driving mode.

FIG. 6 shows a case of charging the storage device 9 when the vehicle is in a stationary state.

When the storage device 9 is charged in a state the vehicle is not moving, the transmission 2 is set to a neutral state and each of the first clutch 3 and the second clutch 30 is connected, and on the other hand, the torque command value to the inverter 11 is controlled to the power generation mode. And then, when the engine 1 is operated, the output thereof is, as shown in the thick line arrow of the drawing, transmitted from the first clutch 3 to the input shaft 2a of the transmission 2 and further, from the gearbox 5 via the second clutch 30 to the input/output shaft 4a of the rotating electric machine 4. The rotating electric machine 4 is driven by the output of the engine 1 for power generation, and the storage device 9 is charged with the generated power.

Figure 7:
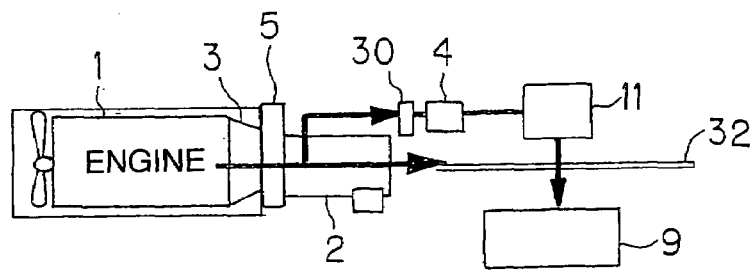
FIG. 7 is an explanatory view illustrating yet another driving mode.

FIG. 7 shows a case where the storage device 9 is also charged simultaneously while the vehicle is traveling.

In the traveling state by only the output of the engine 1 (refer to FIG. 3), when the charge to the storage device 9 is required, the second clutch 30 is switched to the connected state, and on the other hand, a command value is input into the inverter 11 to switch over to the power generation mode. The output of the engine 1 is, as shown in the thick line arrow of the figure, not only transmitted from the input shaft 2a of the transmission 2, through the transmission gears, via the output shaft 2b of the transmission 2 to the propeller shaft 32 but also transmitted via the gearbox 5 and the second clutch 30 to the input/output shaft 4a of the rotating electric machine 4. Owing to the above, the rotating electric machine 4 serves as the electric generator to perform power generation and charges the storage device 9, whereby a storage amount can be increased to a required value.

When the operation of the rotating electric machine 4 is not performed, the second clutch 30 is maintained in the disconnected state, and when the operation of the rotating electric machine 4 is required, the second clutch 30 is switched to the connected state (refer to FIG. 2 and FIGS. 4 to 7). When the second clutch 30 is switched from the disconnected state to the connected state, the rotational speed at the input side and the rotational speed at the output side thereof need to be matched for connection so that the connection can be performed smoothly.

Therefore, in the present invention, it is arranged that, when connection of the second clutch 30 is commanded, the rotating electric machine 4 is first operated as the motor, and only after the rotational speed thereof is substantially matched with the rotational speed of the transmission output shaft 2b, the clutch is connected.

Figure 8:
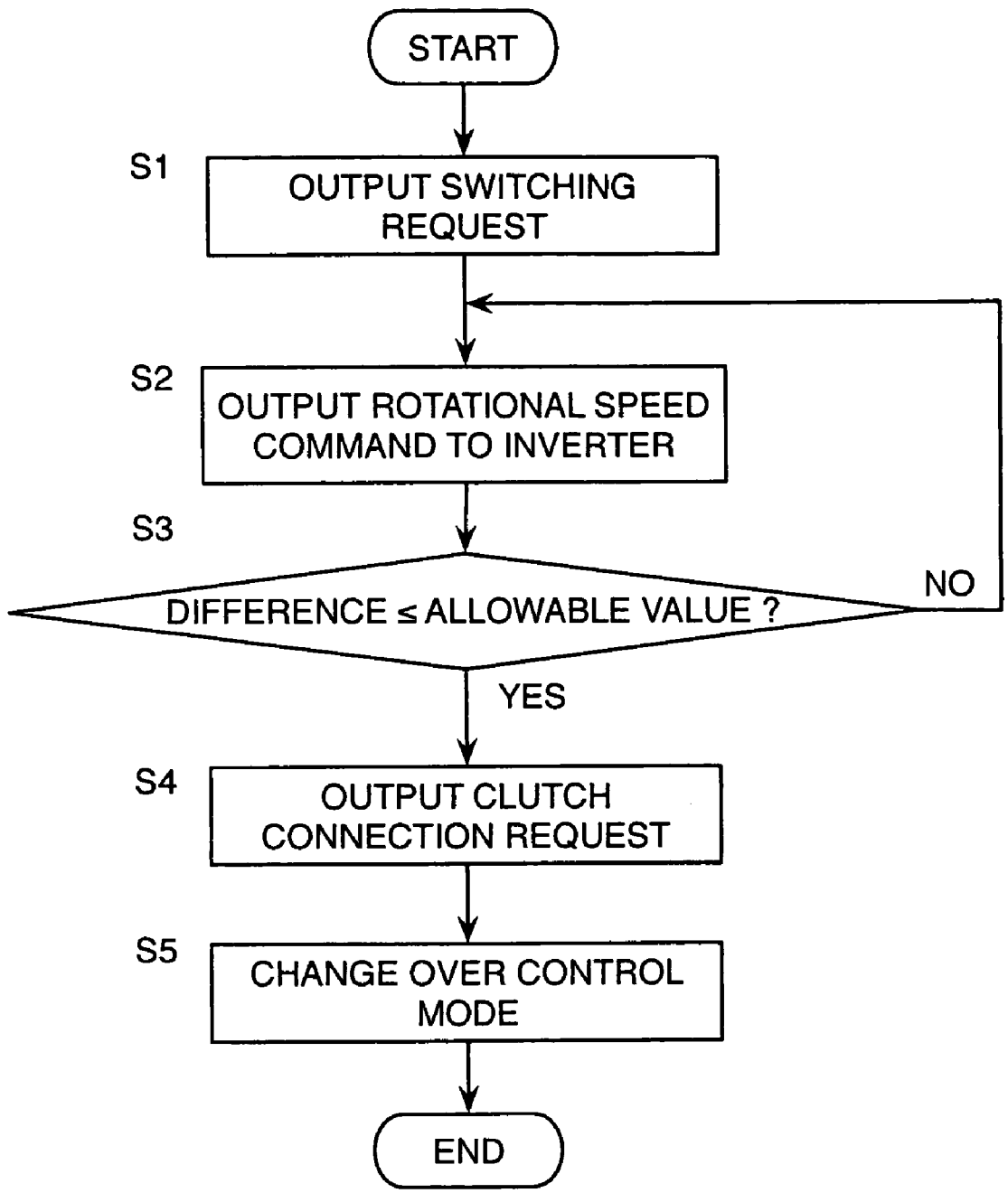
FIG. 8 is a flow chart showing control contents.
Figure 9:
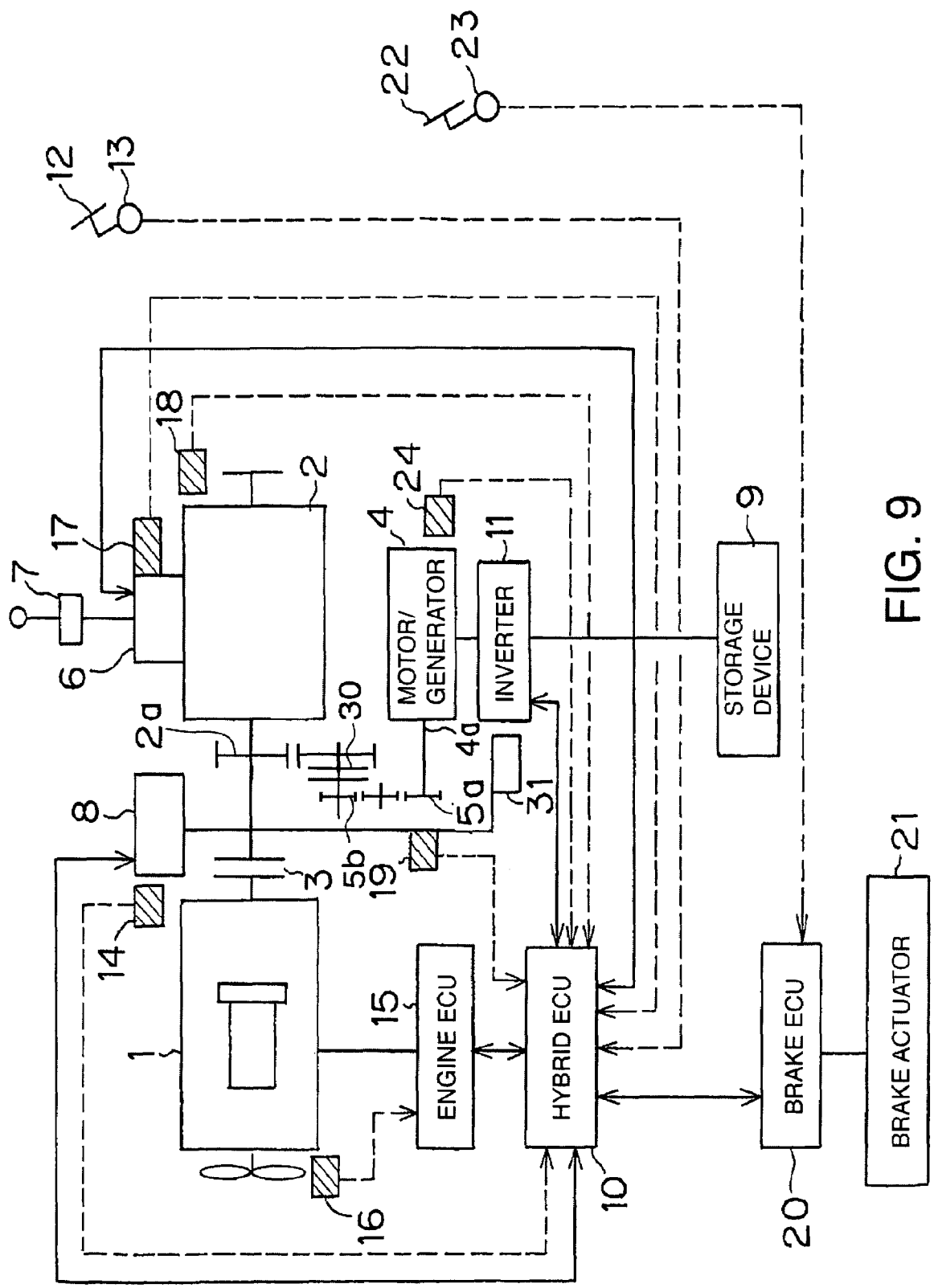
FIG. 9 is a schematic view of a system showing another embodiment according to the present invention.

FIG. 8 is a flow chart for explaining a control routine performed by the hybrid ECU 10 in order to connect the second clutch 30 from the disconnected state.

In a step S1, when the operation of the rotating electric machine 4 is required, the hybrid ECU 10 outputs a switching request for switching the second clutch 30 to the connected state.

In a step S2, a target rotational speed of the rotating electric machine 4 (corresponding to the rotational speed at the gearbox 5 side of the second clutch 30) is obtained on the basis of a detection signal of the engine revolution sensor 16. The target rotational speed is calculated from the rotational speed of the engine 1 and a gear ratio of the gearbox 5. The hybrid ECR 10 then outputs a command to the inverter 11 to control the rotational speed of the rotating electric machine 4 as well as outputting the target rotational speed of the rotating electric machine 4 which corresponds to the rotational speed of the-second clutch 30 at the gear box 5 side.

In a step S3, a signal from the rotational speed sensor 24 which detects the actual rotational speed of the rotating electric machine 4 (corresponding to the rotational speed at the rotating electric machine side of the second clutch 20) is read. The target rotational speed based on the rotational speed of the engine 1 and the actual rotational speed of the rotating electric machine 4 are then compared to determine whether the difference in the rotational speed between the both (the rotational speed at the gearbox 5 side of the second clutch 30 and the rotational speed at the rotating electric machine 4 side of the second clutch 30) is equal to or smaller than a predetermined allowable value (for instance, 0-100 RPM).

When the decision in the step S3 is No, the process returns to the step S2 to wait until the difference in the rotational speed becomes equal to or smaller than the allowable value. In contrast, when the decision in the step S3 is Yes, the process proceeds to a step S4, wherein a clutch connection request is output to the clutch actuator of the second clutch 30. In a step S5, control of the rotational speed of the rotating electric machine 4 by the inverter 11 is switched to torque control thereof and the torque command value is input into the inverter 11 so that the required power generation torque or the drive torque can be obtained from the rotating electric machine 4.

It should be noted that in the step S2, the target rotational speed may not be calculated from the detection value of the rotational speed of the engine and the gear ratio of the gearbox, but as the gear rotation sensor 19 detects the rotational speed of the drive gear 5a which is coupled to the input/output shaft 4a of the rotating electric machine 4, the detection signal of the gear rotation sensor 19 may be used as the target rotational speed.

As shown in FIG. 3, when the operation of the rotating electric machine 4 is not performed, the second clutch 30 is maintained in the disconnected state. In case of travel by only the output of the engine 1, the rotating electric machine 4 is separated from the gearbox 5 and thus the inertial mass and friction have no influence on the drive system, which therefore can promote an improvement of fuel economy of the engine 1.

Moreover, when the operation of the rotating electric machine 4 is required, for instance as shown in FIG. 4, the second clutch 30 is switched to the connected state. At the same time, the rotational speed of the rotating electric machine 4 is rapidly converged to the target rotational speed (corresponding to the rotational speed at the gearbox 5 side of the second clutch 30) by the control of the rotational speed by the hybrid ECU 10, and when the difference in the rotational speed between the target rotational speed and the rotational speed at the rotating electric machine 4 side becomes equal to or smaller than the predetermined allowable value, the second clutch 30 is switched to the connected state. Therefore, switching the second clutch 30 to the connected state can be performed smoothly without trouble in a short time. That is, the generation of shock or abnormal sound (for instance, gear noise in the engagement) in the connection of the second clutch 30 can be prevented, and the reliability and durability of the second clutch 30 can be well secured.

In FIG. 1, the second clutch 30 may be interposed not between the gearbox 5 and the rotating electric machine 4 but between the transmission 2 and the gearbox 5. In this case, besides the input shaft 2a of the transmission 2, a rotating shaft of the driven gear 5b is provided, and another set of a gear mechanism for the coupling of them is disposed. And then, the second clutch 30 is interposed between the rotating shaft of the driven gear 5b and the rotating shaft of another set of the gear mechanism (disposed coaxially with the rotating shaft of the driven gear) and is arranged to connect and disconnect the transmission 2 and the gearbox 5.

Also in the arrangement of the system with respect to the second clutch 30 as described above, in case of travel by only the output of the engine 1, the second clutch 30 is maintained in the disconnected state, and thus, not only the rotating electric machine 4 but also the gearbox 5 is separated from the drive system, which therefore can make the friction loss further smaller and promote the improvement of fuel economy of the engine 1.

INDUSTRIAL APPLICABILITY

The hybrid drive system according to the present invention may be applied as a drive system for various types of vehicles.

The invention claimed is:

1. A hybrid electric drive system for a vehicle comprising:
   a combustion engine;
   a transmission comprising an input shaft and an output shaft and transmitting rotational torque between the input shaft and the output shaft;
   a first clutch adapted to connect the engine to the input shaft of the transmission and to disconnect the engine from the input shaft of the transmission;
   a rotating electric machine which serves as a motor as well as a generator;
   a second clutch which can connect the rotating electric machine to the input shaft of the transmission and disconnect the rotating electric machine from the input shaft of the transmission;
   a storage device which stores electric power generated by the rotating electric machine;
   a control unit programmed to:
      control a rotational speed of the rotating electric machine, when the second clutch is commanded to connect the rotating electric machine to the input shaft of the transmission, so as to decrease the difference between the rotational speed of the rotating electric machine and a rotational speed of the input shaft of the transmission; and
      cause the second clutch to connect the rotating electric machine to the input shaft of the transmission only after the difference decreases to a value within a predetermined allowable range.

2. The hybrid electric drive system as defined in claim 1, wherein the control unit is further programmed to stop controlling the rotational speed of the rotating electric machine and start controlling a rotational torque of the rotating electric machine, when the second clutch has connected the rotating electric machine to the input shaft of the transmission.

3. The hybrid electric drive system as defined in claim 1, wherein the system further comprises a gear mechanism which transmits rotation between the rotating electric machine and the input shaft of the transmission, and the second clutch is interposed between the rotating electric machine and the gear mechanism.

4. The hybrid electric drive system as defined in claim 1, wherein the system further comprises a gear mechanism which transmits rotation between the rotating electric machine and the input shaft of the transmission, and the second clutch is interposed between the gear mechanism and the input shaft of the transmission.

5. The hybrid electric drive system as defined in claim 1, wherein the storage device comprises an electric double layer capacitor.

\* \* \* \* \*